United States Patent

Kah

[11] Patent Number: 6,025,793
[45] Date of Patent: Feb. 15, 2000

[54] INPUT CIRCUIT OF A FIELD DEVICE

[75] Inventor: Harald Kah, Brechen, Germany

[73] Assignee: Samson AG, Frankfurt, Germany

[21] Appl. No.: 09/049,663

[22] Filed: Mar. 27, 1998

[51] Int. Cl.[7] ........................................... H03M 1/12
[52] U.S. Cl. ......................................................... 341/155
[58] Field of Search .................. 341/155; 340/310.06, 340/870.18; 137/85; 307/112; 700/67; 709/201; 324/718

[56] References Cited

U.S. PATENT DOCUMENTS

| | | | |
|---|---|---|---|
| 4,481,967 | 11/1984 | Frick .......................................... | 137/85 |
| 4,737,787 | 4/1988 | Ito et al. .............................. | 340/870.18 |
| 5,434,774 | 7/1995 | Seberger ................................... | 700/67 |
| 5,451,923 | 9/1995 | Seberger et al. .................... | 340/310.06 |
| 5,481,200 | 1/1996 | Voegele et al. ........................... | 324/718 |
| 5,585,678 | 12/1996 | Dijk et al. ................................. | 307/112 |
| 5,684,451 | 11/1997 | Seberger et al. .................... | 340/310.06 |
| 5,793,963 | 8/1998 | Tapperson et al. ...................... | 709/201 |

FOREIGN PATENT DOCUMENTS

OS 30 43 059   6/1982   Germany .

OTHER PUBLICATIONS

Published Student Thesis Entitle "A Microprocesor Controlled Valve Positioner", Feldman, Purdue Technical Information Service, May, 1986.
"HART®—Smart Communications Protocol Specification, Revision 5.1" Feb. 8, 1990.

Primary Examiner—Michael Tokar
Assistant Examiner—Patrick Wamsley
Attorney, Agent, or Firm—Hill & Simpson

[57] ABSTRACT

An input circuit for a field device for communication with bidirectional signals superposed on an analog signal, the input circuit being part of a current loop, supplies the field device with energy and simultaneously carries an analog current signal for prescribing a reference value. The field device is connected to an actuator that is suitable for achieving the reference value, and the input circuit has a voltage limiter, a shunt resistor and an inductance connected in series between its input and output. The input signal of an analog-to-digital converter can be taken at the shunt resistor. The voltage limiter is connected in parallel with a voltage regulator. The inductance is coupled via a capacitance to a reception unit and/or to a transmission unit for digital signals.

10 Claims, 1 Drawing Sheet

INPUT CIRCUIT OF A FIELD DEVICE

BACKGROUND OF THE INVENTION

1. Field of the Invention

The present invention is directed to an input circuit for a field device for communication with bidirectional signals that are superimposed on an analog control signal.

2. Description of the Prior Art

Electrical field devices that employ only the standardized electrical unit signals—particularly a 4 through 20 mA current signal—have been known for a long time. More recent field devices offer expanded parameterization and monitoring possibilities including diagnostic analysis or comparison by simultaneous communication with the field device. Field devices that employ the 4 through 20 mA current signal in a conventional way, for example in the form of a two-conductor device, and overlay this current signal with a high-frequency signal for communication have become widespread.

Particularly devices according to the HART field communication protocol (HART=Highway Addressable Remote Transducer) have become established as quasi standard in this field. Such field devices can be divided into two categories, namely those that impress a current on the two-conductor loop as a transmission signal such as is the case, for example, given measuring transducers for temperature or pressure, and those that receive a current as a control signal such as, for example, given I/P converters or position regulators (known as positioners) for generating a physical quantity, for example a pressure or a valve position.

Particularly for those field devices that receive a current as control signal, the limitation of the energy available for field devices that are designed as two-conductor devices requires special input circuits, since the ohmic resistance must be relatively low in order to cause the consumed energy to be acceptably low. No simple input circuits are known for field devices that receive a current as a corrective signal and enable a superposed digital communication.

SUMMARY OF THE INVENTION

An object of the present invention is to provide an input circuit for a field device that receives a current as a control signal and enables a superposed digital bidirectional communication that overcomes the above-described disadvantages of known devices and which, in particular, exhibits a simple structure.

This object is inventively in an input circuit for a field device for communication with bidirectional signals superimposed on an analog signal, wherein the input circuit is part of a current loop and supplies the field device with energy while simultaneously carrying an analog current signal for prescribing a reference value, the field device being connected to an actuator that is suitable for achieving the reference value. The input circuit has a voltage limiter a shunt resistor and an inductance connected in series between its input and output. The input signal of an analog-to-digital converter can be taken at the shunt resistor. The voltage limiter is connected in parallel with a voltage regulator. The inductance is coupled by means of a capacitance to a reception unit and/or transmission unit for digital signals.

If the inductance is formed by a toil, the ohmic resistance of the coil forming the inductance preferably is selected to be very low to meet d.c. loop requirement.

In an embodiment of the invention the inductance is fashioned as an inductor with a primary coil and a secondary coil, and the secondary coil is electrically arranged between the capacitance and the primary coil.

Further, the inductance can be fashioned as an inductor with a soft-magnetic iron core according to the invention.

Preferably the secondary coil has a number of turns which is a multiple of the number of turns of the primary coil.

In a further embodiment a low-impedance switch can be provided that capacitively couples the transmission unit to the inductance in addition to the reception unit.

The low-impedance switch can be fashioned as a single-pole, double-throw switch between the reception unit and the transmission unit.

The voltage limiter can be realized by a Zener diode.

A capacitor can be arranged in parallel with the voltage regulator.

The input circuit can be of a type which enables a communication according to the HART field communication protocol in a point-to-point connection.

The invention is based on the surprising perception that a transmission unit and/or a reception unit can be coupled to a two-conductor loop for a field device via a passive component, namely an inductance, that can be realized by a coil or inductor, and thus a low d.c. resistance and a high a.c. resistance, i.e. two different, well-defined, frequency-dependent resistances, are automatically present by employing the inductance.

DESCRIPTION OF THE PREFERRED EMBODIMENTS

Figure 1:
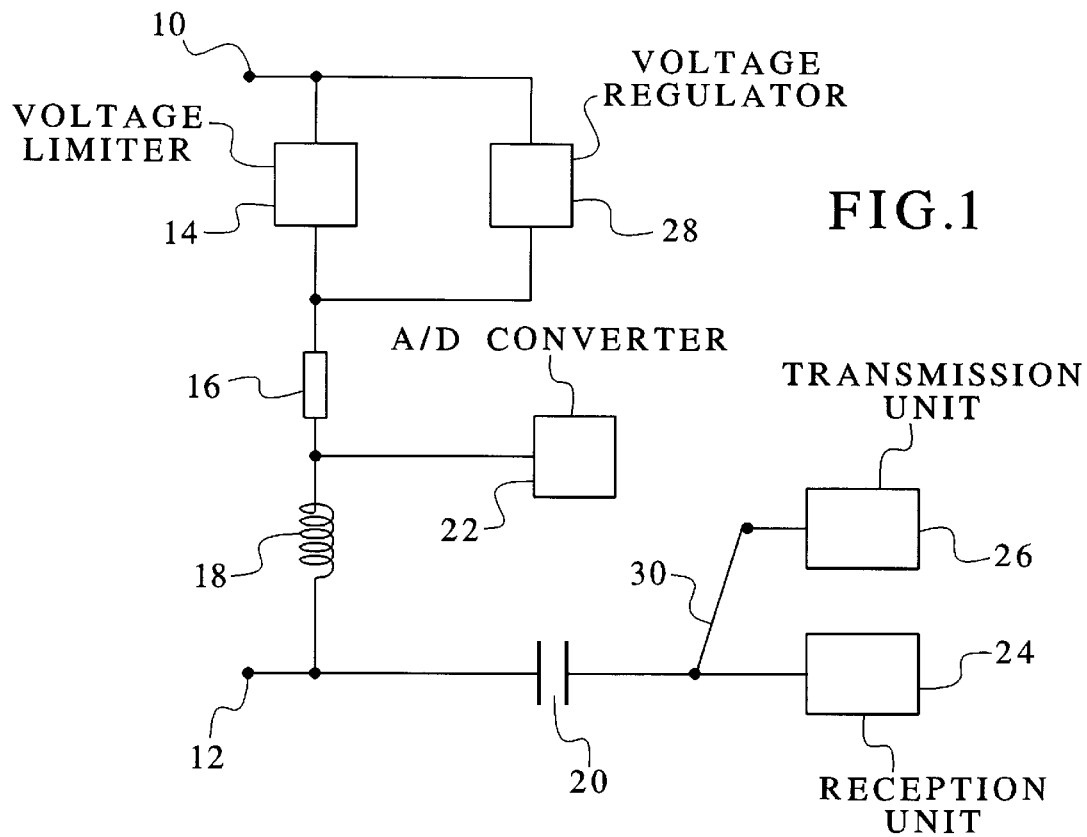
FIG. 1 is a block circuit diagram of a preferred embodiment for an input circuit of the invention.

FIG. 1 shows a schematic circuit diagram of an inventive input circuit having an input 10 and output 12 between which a voltage limiter 14, a shunt resistor 16 and an inductance 18 are connected in series. A voltage regulator 28 is connected in parallel with the voltage limiter 14. The input signal of an analog-to-digital converter 22 is taken at the shunt resistor 16, the output signal thereof being forwarded to a field device (not shown). The further-processing of a control signal for achieving a reference value dependent on which, for example, the field device generates a pneumatic pressure at its output, is not part of the input circuit and is not shown here for clarity.

A coupling to a reception unit 24 and/or a transmission unit 26 for digital signals ensues at the inductance 18 via a capacitance 20. The capacitance 20 can be realized, for example, in the form of a capacitor and fulfills the task of transmitting digital signals but preventing any d.c. current from bypassing the shunt resistor. In an advantageous embodiment of the invention, the digital signals satisfy the HART field communication protocol.

The transmission unit 26 is capacitively coupled to the inductance 18 in addition to the reception unit by a low-impedance switch 30 which produces a connection to the transmission unit 26.

The ohmic resistance of the coil forming the inductance 18 is advantageously selected to be very low 16, so that this unavoidable ohmic resistance barely increases the power consumption of the circuit.

It is also advantageous when a capacitance, i.e. a capacitor, that is not shown is arranged in parallel with the voltage regulator 28 in order to short-circuit a.c. voltage signals at the input of the voltage regulator 28.

Figure 2:
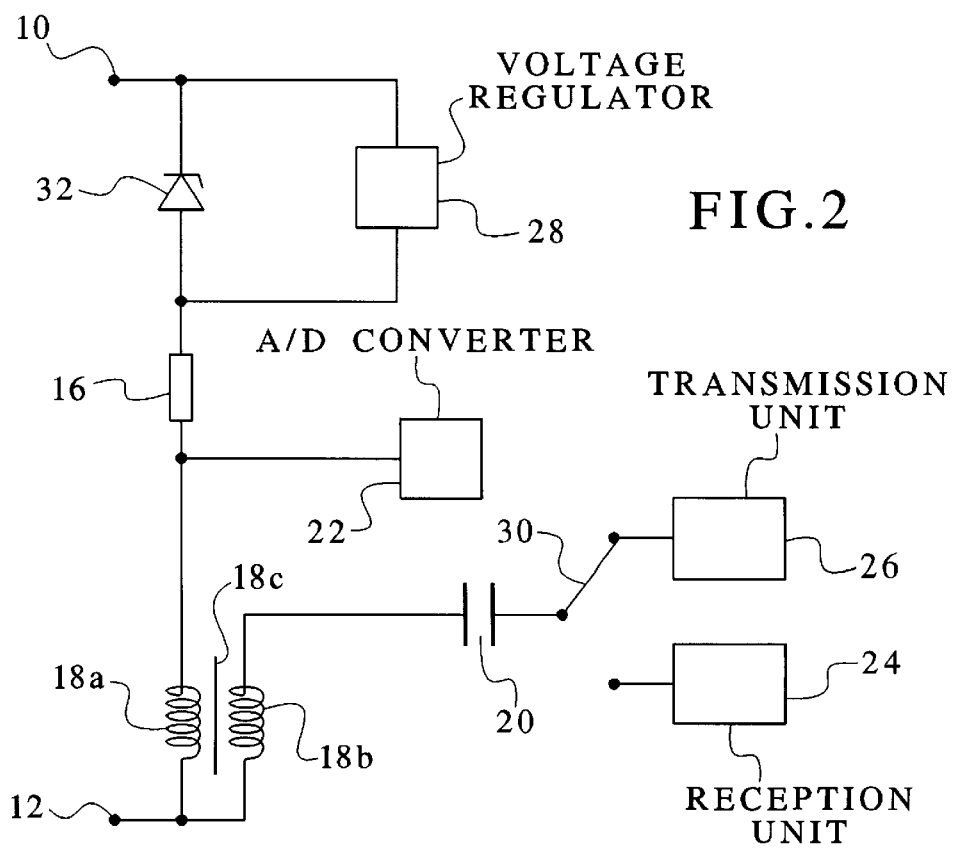
FIG. 2 is a block circuit diagram of a further embodiment for an input circuit of the invention.

It has proven especially beneficial to fashion the inductance 18 as an inductor with a primary coil 18a and a secondary coil 18b, as shown in FIG. 2 for another embodiment of the invention. The secondary coil 18b is electrically arranged between the capacitance 20 and the primary coil 18a. Different numbers of turns of the primary coil 18a and the secondary coil 18b enable a transformation of the signal amplitudes. The secondary coil 18b preferably has a number of turns which is a multiple of the number of turns of the primary coil 18a in order to generate a high transformation ratio. This inductive coupling from the primary coil 18a to the secondary coil 18b is especially efficient when a soft-magnetic iron core 18c is arranged between the two coils.

The inductance 18 is thus realized with a simple, passive component like a coil or an inductor that has well-defined properties, particularly with respect to its frequency behavior. The basic physical properties of a coil already assure the realization of a low d.c. resistance and of a high a.c. resistance by themselves, without the necessity of an active frequency-dependent impedance control, either open loop or closed loop. The impedance characteristics inherently provide the necessary properties. It is thus not necessary to modify these components for realizing the transmission/reception functions, which allows the complete circuit structure to be simple and stable over a broad frequency band and impervious to noise.

The switch can also be fashioned as a single-pole, double throw switch 30' between the reception unit 24 and the transmission unit 26, as indicated in FIG. 2. This has the advantage that the reception unit need not evaluate the transmission signals emitted by the same device in which it is contained.

In an especially simple way, the voltage limiter 14 can be realized by a Zener diode 32, as shown in FIG. 2.

The advantages of the invention thus particularly arise from the realization of a simple input circuit of a field device for communication with bidirectional signals that are overlaid on an analog corrective signal, this making it possible to couple the transmission unit 26 and/or the reception unit 24, to a two-conductor loop via the input 10 and the output 12 with a passive component such as a coil 18 or an inductor 18a, 18b.

Although modifications and changes may be suggested by those skilled in the art, it is the intention of the inventor to embody within the patent warranted hereon all changes and modifications as reasonably and properly come within the scope of his contribution to the art.

I claim as my invention:

1. An input circuit for a field device for communication with bidirectional signals superimposed on an analog signal, said input circuit being part of a current loop that supplies the field device with energy and simultaneously carries an analog current signal for prescribing a reference value, and the field device being connected to an actuator that is suitable for achieving the reference value, said input circuit comprising:

an input and an output;
   a voltage limiter, a shunt resistor and an inductance connected in series between said input and output,
   an analog-to-digital converter supplied with an input signal taken at the shunt resistor;
   a voltage regulator connected in parallel with said voltage limiter,
   a capacitance coupling the inductance to at least one of said reception unit and said transmission unit.

2. An input circuit according to claim 1 wherein said inductance comprises an inductor with a primary coil and a secondary coil, said secondary coil being electrically arranged between the capacitance and the primary coil.

3. An input circuit according to claim 2, wherein said inductor has a soft-magnetic iron core.

4. An input circuit according to claim 3, wherein the secondary coil has a number of turns which is a multiple of turns of the primary coil.

5. An input circuit according to claim 1, further comprising a low-impedance switch that capacitively couples the transmission unit onto the inductance in addition to the reception unit.

6. An input circuit according to claim 5, wherein the low-impedance switch comprises a single-pole, double-throw switch between the reception unit and the transmission unit.

7. An input circuit according to claim 1, wherein the voltage limiter comprises a Zener diode.

8. An input circuit according to claim 1, further comprising a capacitor connected in parallel with the voltage regulator.

9. An input circuit according to claim 1, wherein said input circuit comprises means for communicating according to the HART field communication protocol (HART= Highway Addressable Remote Transducer) in a point-to-point connection.

10. An input circuit according to claim 1, wherein said current loop has d.c. loop requirements associated therewith, and wherein said inductance comprises a coil having an ohmic resistance which is sufficiently low to satisfy said d.c. loop requirements.

* * * * *